Oct. 18, 1938.   E. W. SWANSON   2,133,312
VOLTAGE REGULATOR
Filed May 25, 1936

INVENTOR.
EDWIN W. SWANSON
BY
HIS ATTORNEY

Patented Oct. 18, 1938

2,133,312

UNITED STATES PATENT OFFICE 2,133,312

VOLTAGE REGULATOR

Edwin W. Swanson, Hopkins, Minn., assignor to Electric Machinery Manufacturing Company, Minneapolis, Minn.

Application May 25, 1936, Serial No. 81,705

14 Claims. (Cl. 171—229)

My invention relates to voltage regulators for sources of alternating current and particularly alternating-current generators and has for an object to provide a voltage regulator which operates with variable load, or variable speed of the generator, or both to maintain a substantially constant voltage at the source.

A further object of my invention is to provide a voltage regulator by which any degree of overcompounding or undercompounding may be obtained.

Another object of my invention is to provide a voltage regulator which is characterized by a quick response to changes in the voltage to be regulated.

Another object of this invention is to produce a voltage regulator which is inexpensive in construction, simple and reliable in operation, low in maintenance cost, and easy of adjustment.

These and other objects and advantages of the invention will be fully set forth in the following description made in connection with the accompanying drawing, in which like reference characters refer to similar parts throughout the several views, and in which.

Figures 1, 2:
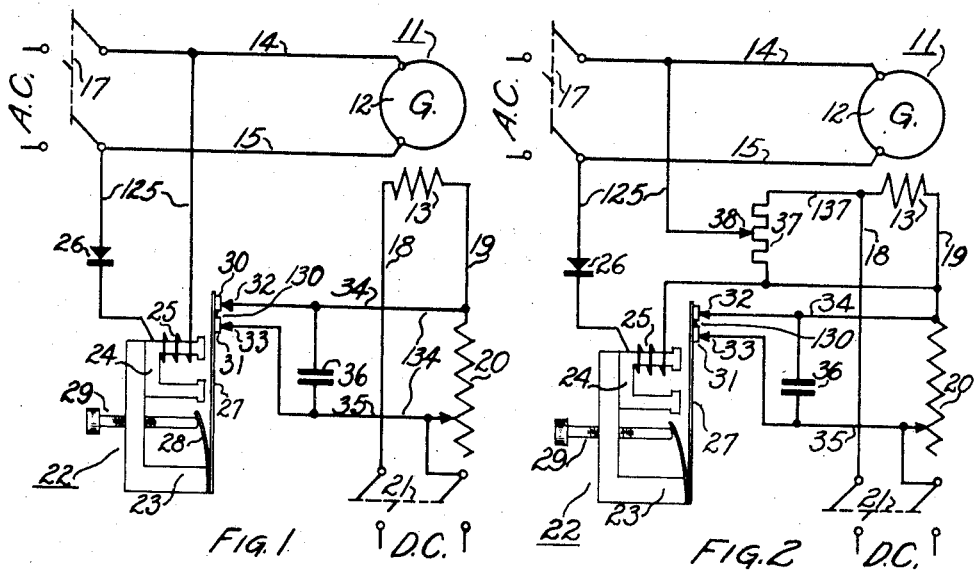
Fig. 1 is a wiring diagram of an embodiment of my invention applied to an alternating-current generator.
Fig. 2 is a wiring diagram of a modification of my invention.

Referring to Fig. 1 of the drawing, an alternating-current generator 11 is illustrated which is provided with an armature winding 12 and a field winding 13. The armature winding 12 is connected to an alternating-current circuit indicated by the reference character A. C. by means of conductors 14 and 15, and a line switch 17. The field winding 13 is energized with direct current derived from conductors 18 and 19 which are connected to a direct-current circuit indicated by the reference character D. C. by means of a field switch 21. An adjustable resistor or rheostat 20 is connected in series with the field winding 13 in the conductor 19. The alternating-current generator 11 is driven by a prime mover, not shown in the drawing.

The invention includes a relay 22 which comprises a nonmagnetic base 23, a magnetic U-shaped core 24 preferably of laminated construction, a relay winding 25 disposed on the core 24, a magnetic armature 27 of the vibratory type, and an adjustment for the armature 27 comprising a resilient member or leaf spring 28 and an adjusting screw 29 screwed in the base 23.

The relay winding 25 is connected in a circuit 125 which I have designated as the control circuit and which is connected to the conductors 14 and 15, and is energized by the voltage of the generator 11. A rectifier 26, preferably of the copper-oxide type, is connected in this circuit in series with the winding 25. The armature 27 operates a switch mechanism 130 which includes two movable contacts 30 and 31 carried by the armature, and two fixed contacts 32 and 33, the contacts 30 and 31 being electrically connected together. The switch mechanism 130 is connected in a circuit 134 which I have designated as the regulating circuit. This circuit includes two conductors 34 and 35 which are connected to contacts 32 and 33 respectively. Conductor 34 is further connected to the conductor 19 and conductor 35 is connected to the movable or adjustable contact of the rheostat 20. In order to reduce the sparking and pitting at the contacts 30, 31, 32 and 33, a condenser 36 is employed which is connected across the fixed contacts 32 and 33. It will readily be noted that one pair of contacts could be utilized to make and break the circuit, but this would materially increase the heating, arcing, and pitting.

The operation of the above embodiment of my invention can best be explained as follows: The armature 27 is so designed that it will respond to the variations in current produced by the current pulses flowing in the control circuit 125. This is made possible by the fact that the current pulses are only fractional-wave and intermittent. In addition, the spring 28 is so designed and screw 29 so adjusted that initiation of movement of the said armature occurs only after the magnitude of the current in said circuit reaches a predetermined value. Assume that the generator voltage drops below its normal value. Since the rectifier 26 allows current to flow only in one direction and the generator voltage is below normal value, the pulsating current flowing in the relay winding 25 will cause a pulsating magnetomotive force of lesser magnitude to attract the relay armature 27 to the core 24. Due to the fact that a certain value of current is needed to initiate movement of armature 27 the time interval that said armature is attracted to the core 24 is less when the voltage is below normal value. In such case the switch mechanism 130 remains closed during the greater portion of each cycle. While the switch mechanism 130 is closed, the rheostat 20 is short-circuited so that a greater amount of direct current flows in the field winding 13 and thereby causes the generator voltage to increase.

Now assume that the generator voltage rises above its normal value. In this case, the pulsating current flowing in the relay winding 25 will increase, causing a pulsating magnetomotive force of greater magnitude to attract the relay armature 27 to the core 24. Since the same value of current is required to attract the relay armature 27 to the core 24, the result will be a pulsating current of greater magnitude attracting the relay armature 27 during a longer duration of time, thus holding the switch mechanism 130 open during a greater portion of each cycle. This action will be further explained in connection with the diagram shown in Fig. 3. While the switch mechanism is open, the resistor or rheostat 20 is not short-circuited so that a smaller amount of direct current flows in the field winding 13 and thereby causes the generator voltage to decrease.

Thus by combining the action due to the low voltage and that due to the high voltage as explained above, my voltage regulator operates to close and to open the switch mechanism 130 intermittently but with varying duration of time during each cycle so as to deliver a direct-current excitation to the field winding which maintains the generator voltage substantially constant.

Adjustment for any desired voltage may be had by means of the adjusting screw 29. By turning the screw 29 to bring increased pressure upon the resilient member or leaf spring 28, the value of the current required to initiate movement of the armature 27 is increased so that the relay operates to maintain a higher voltage; and vice versa. A spirally coiled spring attached to the relay armature 27 may also be used—the adjustment being obtained by means of a threaded screw and nut arrangement.

A modification of my invention is shown in Figure 2 in which an opposing direct-current component is added in the pulsating current which flows through the relay winding 25. Since this modification is in most respects identical with the construction shown in Fig. 1, the same reference numerals will be used to designate similar parts and the description thereof will not be repeated. To supply the added direct-current component, a resistor 37 is employed which is connected in parallel with the field winding 13 by means of a circuit 137. This resistor 37 has an adjustable tap 38 which divides the resistor into two sections, one of said sections being connected in the circuit 125. The rectifier 26, relay winding 25, and said section of resistance 37 are all in series in the circuit 125 which is connected to conductors 14 and 15.

Figure 3:
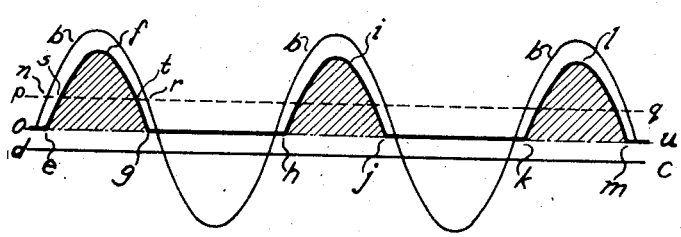
Fig. 3 is a conventional representation of the electric phenomena of my invention.

To better explain the action of the direct-current component utilized in my voltage regulator shown in Fig. 2, reference is to be had to Fig. 3. The zero axis is shown by a straight line $o-u$, and a wave representing several cycles of alternating current corresponding to the terminal voltage of the generator 11 is represented by the curve $b$. The component of direct current as obtained from the lower portion of the resistance 37 is represented by the line $d-c$ which is parallel to the zero axis $o-u$. The direct current must oppose the pulses of alternating current which requires that the rectifier 26 is connected in such a manner that the component of direct current is blocked by the rectifier and does not allow direct current to flow thru winding 25. Due to the action of the rectifier 26 which allows current to flow only in one direction, the alternating current flows during the upper half of each cycle of curve $b$, Fig. 3, and no current flows during the lower half of each cycle. Since the rectifier 26 prevents the flow of the direct current, the direct-current component merely acts as an opposing electromotive force against the intermittent flow of the alternating current, i. e., during the current pulses. The resultant current flowing in the relay winding 25 is shown by the heavy wave, $oefghijklmu$, which comprises three pulses of pulsating current, one pulse for each cycle of alternating current. The shaded areas $efg$, $hij$, and $klm$ represent the pulses of current which pass through the relay winding 25 and produce a pull to attract the relay armature 27 toward the magnetic core 24 during each pulse. The distance from the zero axis $o-u$ to the dotted line $p-q$ represents the current that is necessary to overcome the normal position of the relay armature 27 which normally closes the switch mechanism 130. If the current is greater than this amount, the relay armature 27 is attracted to its core 24 during the time interval from $n$ to $r$ if no component of direct current is utilized as is the case with the embodiment of the invention shown in Fig. 1, or from $s$ to $t$ if the component of direct current is utilized as is the case with the modification of the invention shown in Fig. 2. In the system of Fig. 2 the time interval per cycle during which the armature 27 is attracted depends upon the resultant current as represented by the shaded areas. If a greater direct-current component is used, then the resultant current pulses, as represented by the shaded areas, are decreased which results in a shorter time interval per cycle during which the relay armature 27 is attracted. This leaves the switch mechanism 130 closed during a greater portion of each cycle, which operates to produce increased field excitation and higher generator voltage. If a lesser direct-current component is used, then the resultant current is increased which results in a longer time interval per cycle during which the armature is attracted, which produces decreased field excitation current and lower generator voltage. It will be noted that the switch mechanism 130 is closed while the relay 22 is deenergized, including the time intervals $g$ to $h$ and $j$ to $k$, and during these intervals the rheostat is short-circuited which results in minimum value of resistance and maximum current in the field circuit. The switch mechanism 130 is open while the relay 22 is energized which occurs during the various current pulses, and during these current pulses, the resistor 20 is not short-circuited which results in connecting the operative value of resistor 20 in the circuit.

The armature 27 in normal operation of the voltage regulator has a vibratory action corresponding to the frequency of the control circuit voltage. This action may cease if the voltage becomes too low. In such case the armature 27 is not attracted to the core 24 and the switch mechanism 130 remains closed. Where the drop in voltage is only temporary, the action of the voltage regulator would be periodic. Such action would occur if the generator voltage dropped to a value below the line $p-q$ of Fig. 3 in which case the regulator would perform its maximum duty by continually short-circuiting the rheostat to furnish maximum field excitation current.

Figure 4:
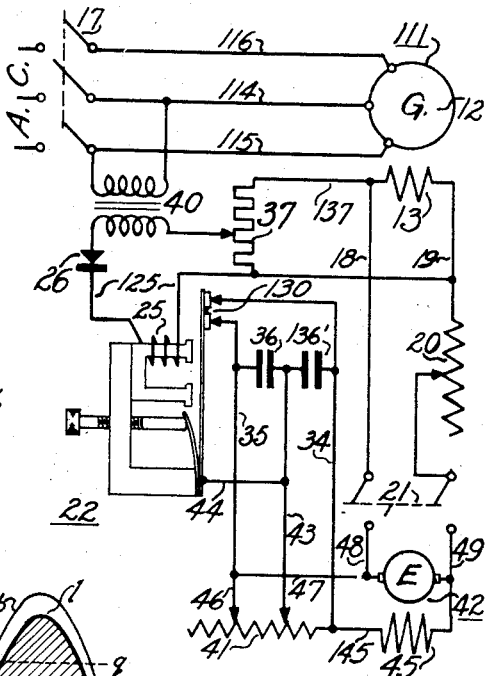
Fig. 4 is a wiring diagram of still another modification of my invention.

In Fig. 4 another modification of my invention is shown which is especially applicable to large high-voltage alternating-current generators. In this form of the invention a three-phase generator has been shown which is indicated by the reference numeral 111. This generator is connected to a three-phase circuit comprising conductors 114, 115 and 116. The relay and certain other features of this form of the invention being identical with that shown in Fig. 2, similar reference characters will be used to designate corresponding parts of elements and the description thereof will not be repeated. This form of the invention includes two condensers, 36 and 136', and operates on the rheostat 41 in the shunt field circuit 145 of a direct-current generator or exciter 42 which supplies the direct-current excitation to the field winding 13 of alternating-current generator 11. To further reduce the sparking and pitting of the contacts comprising the relay switch mechanism 130, the two condensers 36 and 136' are connected in series, one across each pair of contacts. The midpoint between the condensers is electrically connected to the center of the rheostat 41 by means of a conductor 43 and to the relay armature 27 by means of a conductor 44. The shunt field circuit 145 of exciter 42 includes a shunt field winding 45, the rheostat 41, and conductors 46 and 47. The exciter output terminals are electrically connected to the field switch 21 by means of conductors 48 and 49. The form of the invention shown in Fig. 4 differs further from the construction shown in Fig. 2 in that the control circuit 125 is energized by a potential transformer 40 whose primary is connected to conductors 14 and 15 of the three-phase circuit. Such potential transformer may also be used with the forms of invention shown in Figures 1 and 2.

Even though the modification of Fig. 4 is quite similar in many respects to that shown in Fig. 2, an explanation of its operation may be useful. During normal operation, the alternating-current generator 11 is driven by a prime mover and the field switch 21 is closed furnishing direct-current excitation to the generator field winding 13, and the line switch 17 is closed delivering alternating current. When the generator voltage drops below the normal value, the pulsating current in the regulator winding 25 decreases as explained in connection with Fig. 3. This results in a decreased magnetomotive force in relay 22 so that the switch mechanism 130 remains closed during the greater portion of each cycle to short-circuit the rheostat 41. This increases the shunt field current which serves to increase the output of exciter 42 and thereby supply increased direct-current excitation to the generator field winding 13 which increases the generator voltage. If the generator voltage rises above the normal value, the pulsating current in winding 25 increases which operates to decrease the shunt field current of exciter 42 and thereby decrease the direct-current excitation and the generator voltage.

Figure 5:
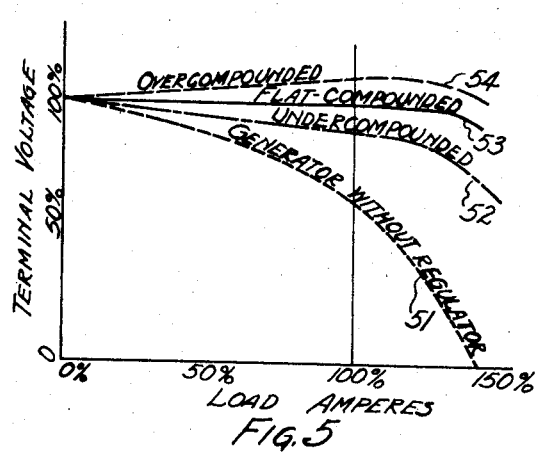
Fig. 5 is a load characteristic diagram of a generator, showing the results obtainable with my invention.

The curves of Fig. 5 will serve to show the relation of terminal voltage to load amperes of a typical alternating-current generator under four different conditions. Curve 51 labeled "Generator without regulator" shows the normal characteristic of the generator operating without a regulator and with sufficient direct-current excitation to supply 100% terminal voltage at 0% load amperes. Curve 52 labeled "Undercompounded" shows a better characteristic than that of curve 51, since the terminal voltage is held up to a higher value at all loads than that of curve 51 but not high enough to maintain a constant voltage with increase of load. Such a relation would be obtained by the use of the form of the invention shown in Fig. 1, and it may also be obtained by use of the modifications shown in Figures 2 and 4 by proper adjustment of tap 38 on resistor 37. Curve 53 labeled "Flatcompounded" shows the characteristic in which the terminal voltage is maintained substantially constant from no-load amperes to 100% load amperes, resulting in a substantially flat curve. This characteristic may be obtained by use of the modifications shown in Figures 2 and 4. Curve 54 labeled "Overcompounded" shows the characteristic in which the terminal voltage increases with increase of load from no-load amperes to 100% load amperes, and may be obtained by the use of the modifications shown in Figures 2 and 4 by proper adjustment.

As load is added on the generator, the field excitation current must increase in order to maintain substantially constant voltage. With particular reference to Figures 3 and 5, the following added explanation of my invention is given: As the load on the generator is increased, the alternating-current voltage tends to decrease and therefore lesser pulses of current tend to flow through the control circuit 125, which in turn operates to supply an increased field excitation current and a higher generator voltage as fully explained heretofore. This increased field excitation current also supplies a larger direct-current component to the control circuit 125 so that line $d$—$c$ in Fig. 3 drops further away from the zero axis $o$—$u$. Thus as the generator voltage is restored to normal value, the shaded areas of each current pulse become smaller which provides a longer duration of time per cycle that the contact mechanism 130 remains closed, just as is desired in order to supply the required direct-current excitation at all loads. Therefore, it is possible to add load until the excitation current becomes so high that the shaded areas fall below line $p$—$q$, resulting in the drooping characteristic of curves 52, 53 and 54 as shown beyond 100% load amperes in Fig. 3.

My voltage regulator is simple in both mechanical and electrical aspects, yet operates at a high degree of accuracy to maintain constant voltage from no-load to 100% load amperes on an alternating-current generator. Even with a variation in speed, up to 5% of the normal speed, the regulator operates to maintain substantially constant voltage. It is very inexpensive, easily adjusted, and requires minimum maintenance. With my invention a continual vibratory action is obtained which provides a sensitive and quick-acting regulator, due to the minimization of inherent delays necessary in overcoming internal friction, mass, etc.

It will be understood that my invention is applicable to single-phase, three-phase, and other polyphase systems. It may also be used to regulate the voltage of a plurality of generators excited from one source of direct current, the regulator being responsive to the alternating-current bus voltage and operating to increase or decrease the direct-current excitation to all the generators. It will also be understood that my voltage regulator need not operate upon a resistor, since it is obvious to one skilled in the art that the relay 22 may also operate upon the grid of thermionic tubes, or upon a carbon pile rheostat controlling the resistance thereof to vary the direct-current excitation supplied to the field winding of the generator.

It will, of course, be understood that various changes may be made in the form, details, proportions and arrangements of the parts, without departing from the scope of my invention, which generally stated, consists in a device capable of carrying out the objects above set forth and in the novel parts and combination of parts disclosed and defined in the appended claims.

What I claim as new and desire to secure by Letters Patent of the United States is:

1. A voltage regulator comprising a relay including a core, a winding thereon, and a vibratory armature, an alternating-current control circuit energized by the voltage to be regulated, said winding being connected in said control circuit, a rectifier in said control circuit for supplying intermittent fractional wave current pulses to said winding, said armature being capable of movement in conformity with said current pulses, adjustable means for controlling initiation of movement of said armature, and means operated by said armature for regulating the voltage.

2. A voltage regulator comprising a relay including a winding and switch means, an alternating-current control circuit energized by the voltage to be regulated, said winding being connected in said control circuit, a rectifier in said control circuit effecting in said winding intermittent fractional wave pulses, a source of uniform direct current in said control circuit independent of said voltage, a regulating circuit, said switch means being connected in said regulating circuit, and means operated by said regulating circuit for varying the voltage to be regulated.

3. A voltage regulator for a generator having a field winding, said regulator comprising a relay including a winding and switch means, an alternating-current control circuit energized by the voltage to be regulated, said winding being connected in said control circuit effecting in said winding intermittent fractional wave pulses, a rectifier in said control circuit, a regulating circuit and a resistor connected in series with said field winding and in said regulating circuit, said switch means being connected in said regulating circuit, said regulating circuit intermittently shunting said resistor once for each cycle for varying the voltage to be regulated.

4. A voltage regulator comprising a relay including a core, a winding thereon, and a vibratory armature, an alternating-current control circuit energized by the voltage to be regulated, said winding being connected in said control circuit, a rectifier in said control circuit for supplying intermittent fractional wave current pulses to said winding, said armature being capable of movement in conformity with said current pulses, switch means operated by said armature, a regulating circuit including said switch means, and means operated by said regulating circuit for varying the voltage to be regulated.

5. A voltage regulator comprising a relay including a core, a winding thereon, and a vibratory armature, an alternating-current control circuit energized by the voltage to be regulated, said winding being connected in said control circuit, a rectifier in said control circuit for supplying intermittent fractional wave current pulses to said winding, said armature being capable of movement in conformity with said current pulses, and means operated by said armature for regulating the voltage.

6. A voltage regulator comprising a relay including a core, a winding thereon, and a vibratory armature, an alternating-current control circuit energized by the voltage to be regulated, said winding being connected in said control circuit, a rectifier in said control circuit for supplying intermittent fractional wave current pulses to said winding, a source of direct current in said control circuit independent of the generator voltage, said armature being capable of movement in conformity with said current pulses, and means operated by said armature for regulating the voltage.

7. A voltage regulator comprising a relay including a winding and switch means, an alternating-current control circuit energized by the voltage to be regulated, said winding being connected in said control circuit, a rectifier in said control circuit effecting in said winding intermittent fractional wave pulses, a source of direct current in said control circuit opposing the flow of current through said rectifier, a regulating circuit, said switch means being connected in said regulating circuit, and means operated by said regulating circuit for varying the voltage to be regulated.

8. A voltage regulator comprising a relay including a core, a winding thereon, and a vibratory armature, an alternating-current control circuit energized by the voltage to be regulated, said winding being connected in said control circuit, a rectifier in said control circuit for supplying intermittent fractional wave current pulses to said winding, a source of direct current in said control circuit opposing the flow of current through said rectifier, said armature being capable of movement in conformity with said current pulses, and means operated by said armature for regulating the voltage.

9. A voltage regulator for alternating current comprising a relay, a rectifier for supplying intermittent fractional wave current pulses to said relay from the voltage to be regulated, said relay acting in conformity with said pulses, and means controlled by said relay and responsive to the effect of said pulses during the time that the relay is actuated thereby, for regulating the voltage.

10. A voltage regulator for alternating current comprising a relay, a rectifier for supplying to said relay intermittent fractional wave current pulses from the voltage to be regulated, said relay acting in conformity with said pulses and such action being initiated when the pulse reaches a certain magnitude, and means controlled by said relay and responsive to the effect of said pulses during the time that the relay is actuated thereby for regulating the voltage.

11. A voltage regulator for alternating current comprising a relay, a rectifier for supplying to said relay intermittent fractional wave current pulses from the voltage to be regulated, said relay acting in conformity with said pulses and such action being initiated when the pulse reaches a certain magnitude, and a variable resistor having a minimum and operative resistance for regulating the voltage, and means controlled by said relay and responsive to the effect of said pulses for rendering effective the operative resistance of said resistor during the time that said relay is active and rendering effective the minimum resistance of said resistor during the time that said relay is inactive.

12. A voltage regulator for a generator having a field winding, said regulator comprising a relay including a winding and switch means, an alternating-current control circuit energized by the voltage to be regulated, said winding being connected in said control circuit, a rectifier in said control circuit, a source of direct current for energizing said field winding, means responsive to the voltage across said field winding for impressing on said control circuit a direct-current voltage opposing the flow of current through said rectifier, and means operated by said regulating circuit for regulating the voltage.

13. A voltage regulator for an alternating-current system, said regulator comprising a single-phase control circuit energized by the voltage to be regulated, a winding in said circuit, a single half-wave rectifier in said circuit effecting in said winding intermittent half-wave current pulses, a regulating circuit, a switch in said regulating circuit operated by said winding, and means operated by said regulating circuit for varying the voltage of said system.

14. A voltage regulator for an alternating-current system, said regulator comprising a single-phase control circuit energized by the voltage to be regulated, a winding in said circuit, a single half-wave rectifier in said circuit effecting in said winding intermittent fractional-wave current pulses, a regulating circuit, a switch in said regulating circuit operated by said winding, and means operated by said regulating circuit for varying the voltage of said system.

EDWIN W. SWANSON.